United States Patent
Xiao

(10) Patent No.: US 8,583,327 B2
(45) Date of Patent: Nov. 12, 2013

(54) TIRE BURST DETECTING AND ANTI-DEVIATION SYSTEM AND METHOD THEREOF

(75) Inventor: Dongping Xiao, Guangdong (CN)

(73) Assignee: Shenzhen Toyi Electronic Co., Ltd., Shenzhen, Guangdong (CN)

( * ) Notice: Subject to any disclaimer, the term of this patent is extended or adjusted under 35 U.S.C. 154(b) by 228 days.

(21) Appl. No.: 13/126,895

(22) PCT Filed: Oct. 31, 2008

(86) PCT No.: PCT/CN2008/072902
§ 371 (c)(1),
(2), (4) Date: Apr. 29, 2011

(87) PCT Pub. No.: WO2010/048761
PCT Pub. Date: May 6, 2010

(65) Prior Publication Data
US 2012/0053792 A1    Mar. 1, 2012

(51) Int. Cl.
*B62D 6/00*    (2006.01)

(52) U.S. Cl.
USPC ............... 701/41; 701/70; 701/29.2; 340/444

(58) Field of Classification Search
USPC ........... 73/146, 146.2; 701/36, 41, 70, 71, 78, 701/82, 83, 29.1, 39.2; 340/444
See application file for complete search history.

(56) References Cited

U.S. PATENT DOCUMENTS

| | | | | |
|---|---|---|---|---|
| 5,583,483 | A * | 12/1996 | Baumann | 340/444 |
| 5,696,681 | A * | 12/1997 | Hrovat et al. | 701/70 |
| 2004/0095231 | A1* | 5/2004 | Ichinose | 340/442 |
| 2005/0080546 | A1* | 4/2005 | Milot | 701/70 |
| 2005/0182550 | A1* | 8/2005 | Matsuura | 701/78 |
| 2006/0058977 | A1* | 3/2006 | Zhu | 702/148 |
| 2006/0267750 | A1* | 11/2006 | Lu et al. | 340/440 |
| 2008/0238645 | A1* | 10/2008 | Oshiro | 340/444 |

FOREIGN PATENT DOCUMENTS

| | | |
|---|---|---|
| CN | 2435290 Y | 6/2001 |
| CN | 1341519 A | 3/2002 |
| CN | 1865052 A | 11/2006 |
| CN | 101074014 A | 11/2007 |
| JP | 2008195147 A | 8/2008 |

* cited by examiner

*Primary Examiner* — Khoi Tran
*Assistant Examiner* — Adam Mott
(74) *Attorney, Agent, or Firm* — Morris Manning & Martin LLP; Tim Tingkang Xia, Esq.

(57) ABSTRACT

A tire burst detecting and anti-deviation system comprises an ABS system component, a brake chief-pump (2) and a braking circuit (4) connecting to the ABS system component, and an ESP system component electrically connecting to the ECU of the ABS system component. The ECU further includes an acquisition module for acquiring signals from the sensors in the ABS system and the ESP system, a judging module for judging whether the tire burst has occurred or not based on the acquired signals, and a calculating module for calculating the deviation rectifying angle based on the acquired signal. The ABS system component rectifies deviation based on the deviation rectifying angle. A method used in the tire burst detecting and anti-deviation system is also disclosed.

4 Claims, 4 Drawing Sheets

TIRE BURST DETECTING AND ANTI-DEVIATION SYSTEM AND METHOD THEREOF

FIELD OF THE INVENTION

Certain embodiment of present invention relates to a security system for automobile safety. More specifically, certain embodiment of the invention relates to a tire burst detecting and anti-deviation system and method thereof.

BACKGROUND OF THE INVENTION

Tire burst is one of the main reasons for the serious traffic accidents on the highways. In the prior art, there are many devices designed to comprise safety device for tire burst of automobiles and automatic brake device, etc. Such devices need another additional monitoring and controlling system, which leads to the increase of hardware cost and inconvenience of installation. In addition, ABS system (anti-locked braking system) of automobiles is maturing both at home and abroad, and a plurality of technologies, for example, EBD (electronic brake force distribution) and TCS (traction control system) are added on the basis of the ABS system through constant development. ESP (electronic stability program) has mature products in a number of foreign manufacturers. During the application of ABS components, the following components comprising steering sensor, runout rate sensor, transverse acceleration sensor, etc. are appended on ESP. At present, ESP is still technically in the development stage in domestic. TPMS (tire pressure monitor system) technology is utilized for tire burst detecting at abroad, while BMBS (Blowout monitoring and brake system) technology is used in domestic, which is added with brake control after tire burst on the basis of TPMS technology.

However, hardware and software comprising a pressure detecting sensor, a signal receiving apparatus, a control system and so on are needed to be installed in the tire for such above two technologies. Additionally, the prior technologies mainly aim at the braking of automobiles after tire burst, lacking the functionality of anti-deviation. In practice, tire burst mainly takes place on the highway when automobiles are at a high speed, serial rear-end collision accidents are most likely to be caused during emergency braking. In the tire burst control disclosed in Chinese Patent Application No. CN200610146050.6 (DEVIATION RECTIFYING SYSTEM FOR TIRE BURST SAFETY BRAKING OF AUTOMOBILES), deviation rectifying is performed without the measurement of steering angle of the vehicle after tire burst by a runout rate sensor and a transverse acceleration sensor, which causes relatively large errors in actual deviation rectifying in the absence of right basis.

SUMMARY OF THE INVENTION

A system and method for tire burst detecting and anti-deviation which can be used for tire burst detecting and deviation rectifying with low cost, substantially as shown in and/or described in connection with at least on of the figures, as set forth more completely in the claims, aiming at the technical problem of additional cost that hardware comprising pressure detecting sensor is needed in tire in prior technology.

According to an aspect, a system for tire burst detecting and anti-deviation is provided, the system comprising: an ABS system component, a brake chief-pump and a brake circuit connected with the ABS system component, and an ESP system component electrically connected with an electrical control unit (ECU) of the ABS system component; the electrical control unit further comprises an acquisition modules for acquiring signals from sensors in the ABS system and the ESP system, a judging module for judging whether the tire burst has occurred based on the acquired signals, and a calculating module for calculating a deviation rectifying angle based on the acquired signals; the ABS system component rectifies deviation based on the deviation rectifying angle.

In the above mentioned system for tire burst detecting and anti-deviation, the ABS system component further comprises a wheel speed sensor electrically connected with the ECU for measuring wheel speed signals.

In the above mentioned system for tire burst detecting and anti-deviation, the ESP system component further comprises a steering sensor for measuring a steering angle of a steering wheel, a runout rate sensor for measuring an angle of a automobile deviating from a straight-line, and a transverse acceleration sensor for measuring sideslip signals when the automobile turns, which are electrically connected with the ECU.

In the above mentioned system for tire burst detecting and anti-deviation, the judging whether the tire burst has occurred or not comprises judging whether the wheel speed signals grow strong suddenly and whether the steering wheel steers according to the real-time sensor signals stored in a memory of the ECU; if the steering wheel steers, further judging whether the runout rate signal and sideslip signals are smaller than or equal to steering signals; the judging modules are also utilized to judge whether the signal value of the runout rate sensor is zero when braking and deviation rectifying.

In the above mentioned system for tire burst detecting and anti-deviation, the system further comprises a tire burst indicator lamp for alarming tire burst and an ABS warning lamp for ABS alarming when the judging modules judges that a tire burst has occurred, both of the lamps are electrically connected with the ECU.

According to an aspect, a method for tire burst detecting and anti-deviation is provided, the method comprising:

A: acquiring a vehicle condition signal from a sensor;

B: judging whether a tire burst has occurred based on the acquired vehicle condition signal from the sensor; if so, step C will be executed, if not, return to step A; and C: performing deviation rectifying for an automobile according to acquired signals of a runout rate sensor.

In the method for tire burst detecting and anti-deviation, the vehicle condition signal comprises a wheel speed signal, a steering signal of a steering wheel, a deviation angle signal when an automobile deviating from a straight-line, and a sideslip signal when the automobile turning.

In the method for tire burst detecting and anti-deviation, the step B comprises:

B1: judging whether speed of one wheel grows large suddenly according to the acquired signals of a wheel speed sensor; if so, step B2 will be executed; if not, making a judgment that no tire burst has occurred by a judging module;

B2: judging whether the steering wheel steers according to the acquired signals of a steering sensor; if not, making a judgment that a tire burst has occurred, if so, step B3 will be executed; and B3: judging whether the signal values of the runout rate sensor and the transverse acceleration sensor are smaller than or equal to that of the steering sensor; if so, making a judgment that no tire burst has occurred by the judging module; if not, making a judgment that a tire burst has occurred.

In the method for tire burst detecting and anti-deviation, the step C for deviation rectifying the burst tire comprises:

C1: calculating an angle for deviation rectifying according to the steering angle signal value of the steering sensor, the signal values of the runout rate sensor and transverse acceleration sensor;

C2: braking other tires or the tires on the other side of the burst tire according to the calculated angle for deviation rectifying; and C3: judging whether the signal value of the runout rate sensor is zero after braking; if so, deviation rectifying is accomplished; if not, step C2 will be executed again.

In the method for tire burst detecting and anti-deviation, the method further comprises sending a tire burst alarm signal and an ABS alarm signal when making a judgment that a tire burst has occurred.

When implementing present system and method for tire burst detecting and anti-deviation, following advantageous effects will be obtained: whether the tire burst has occurred can be detected and judged by the judging module based on the acquired signals from the information acquisition module; when a tire burst occurs, other tires or the tires on the other side of burst tire are braked by a regulator valve adjusted by the ECU; and precise deviation rectifying is performed according to the angle measurement of the runout rate sensor and transverse acceleration sensor. Accordingly, the invention is operable to monitor tire burst and perform deviation rectifying precisely without additional hardware, leading to a low cost.

BRIEF DESCRIPTION OF THE DRAWINGS

The present invention will be further illuminated combining the following embodiment and drawings.

The appended drawing references are listed below:
1 ECU and magnetic valve;
2 brake chief-pump;
3 wheel speed sensor;
4 brake circuit;
5 ABS warning lamp;
6 indicator lamp for tire burst;
7 runout rate sensor;
8 steering sensor
9 transverse acceleration sensor.

DETAILED DESCRIPTION OF THE PREFERRED EMBODIMENT

When the pressure in the tire becomes low, the wheel diameter decreases and wheel speed then grows larger. The system of the invention judges the wheel with higher speed by calculating signals of wheel speed sensor. When a tire burst occurs (especially the steering wheel), the wheel diameter suddenly decreases and automobile may deflect. The system of the invention calculates the deviated angles of transverse acceleration sensor and runout rate sensor, and may judge that a tire burst occurs when the steering sensor does not deflect at this moment. System control procedures will start an automatic control of ABS and direction deviation rectifying in 20 ms.

Figure 1:
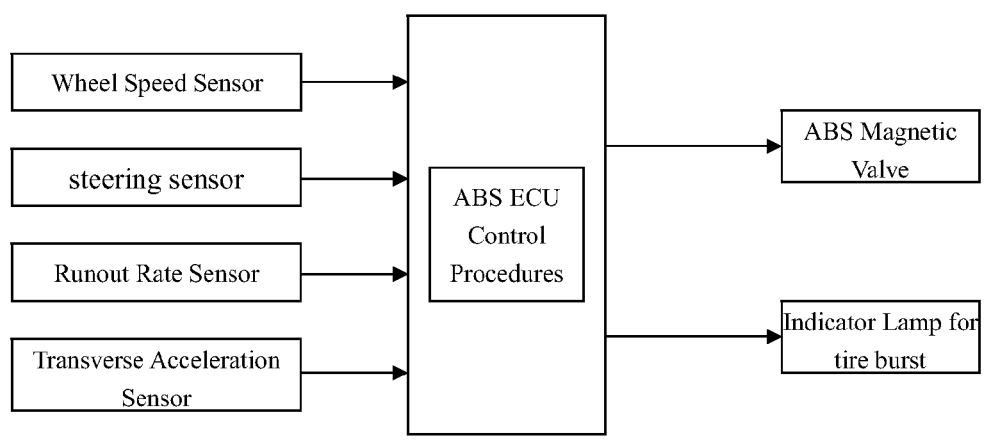
FIG. 1 is a principle block diagram of present invention.
Figure 2:
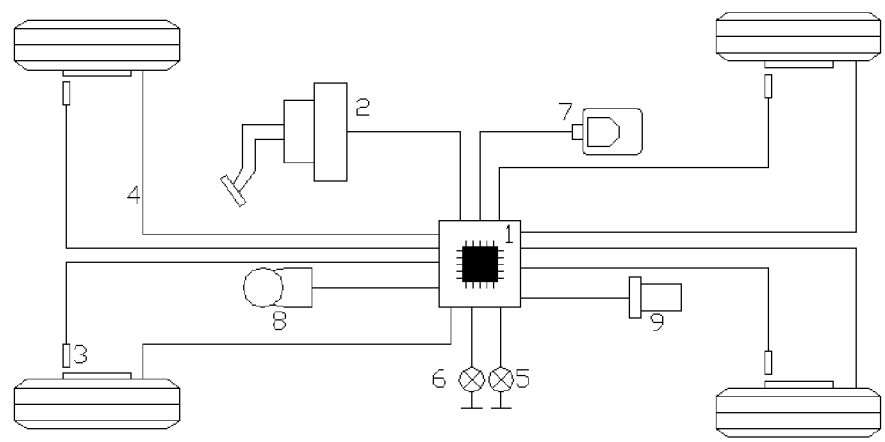
FIG. 2 is a structure diagram of present invention.

The present invention is on the basis of ABS system and ESP system. As shown in FIG. 1 and FIG. 2, FIG. 1 is a principle block diagram of the present invention while FIG. 2 is a structure diagram of the present invention. An ABS system component comprises ECU and magnetic valve 1 and wheel speed sensor 3. ESP system component comprises runout rate sensor 7, steering sensor 8 and transverse acceleration sensor 9, all of which are electrically connected with ECU.

A system for tire burst detecting and anti-deviation is provided in the present invention. The system comprises ECU and magnetic valve 1, brake chief-pump 2, wheel speed sensor 3, brake circuit 4, runout rate sensor 7, steering sensor 8, transverse acceleration sensor 9, ABS warning lamp 5 and indicator lamp for tire burst 6. Any other above component is electrically connected with ECU and magnetic valve 1.

Wheel speed sensor 3 is used for measuring wheel speed signal. Steering sensor 8 is for measuring the steering angle of steering wheel. Runout rate sensor 7 is used for measuring angle for automobiles deviating from a straight-line, which means judging whether automobiles are running along a straight-line. The signal value of runout rate sensor is the specific angle value that automobiles deviate form a straight-line, when automobiles are out of the state of running along a straight-line. Transverse acceleration sensor 9 is used for measuring sideslip signal when automobiles turn, and judging whether automobiles sideslip when running through a corner or turning. When the judging module makes a judgment that a tire burst occurs, indicator lamp for tire burst sends a tire burst alarm and the ABS warning lamp sends an ABS alarm.

Figure 3:
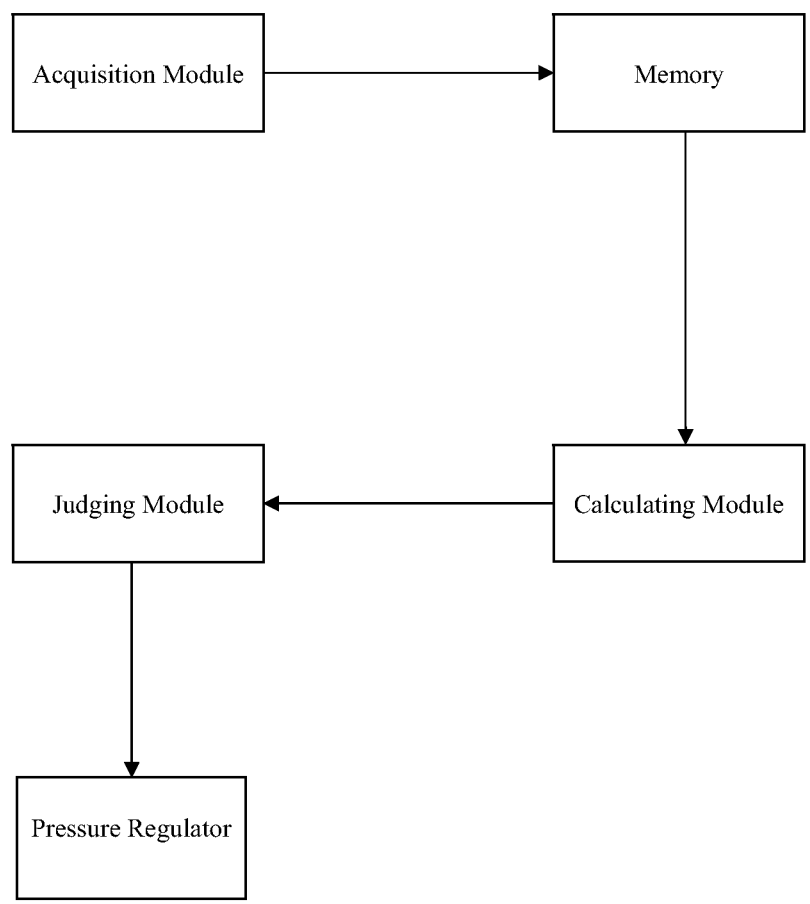
FIG. 3 is a structure diagram of the electrical control unit in an embodiment of the present invention.

With regard to FIG. 3, FIG. 3 is a structure diagram for ECU. The ECU comprises acquisition module, judging module and calculating module. The acquisition module provides the ECU with the signals acquired from a variety of sensors in ABS system and ESP system. Vehicle condition signals comprising wheel speed signal, steering signal of steering wheel, deviation angle signal for automobiles deviating from a straight-line and sideslip signal when automobiles turn, are acquired by sensors when automobiles are running. The signals of wheel speed sensor 3, steering sensor 8, runout rate sensor 7 and transverse acceleration sensor 9 are acquired through acquisition module by ECU for the constant monitoring of driving conditions of automobiles. ECU may then judge the driving conditions of automobiles in time and control the driving conditions accordingly. The judging module is used for judging whether a tire burst occurs according to the acquired vehicle condition signals. The judging module is also utilized for judging whether the signal value of runout rate sensor is zero when braking and deviation rectifying. If a tire burst is judged to occur, the pressure regulator connected with ECU in ABS system component will regulate the pressure of brake circuit 4 for deviation rectifying. The judgment process will be illustrated detailedly in the following discussion with regard to FIG. 4. The calculating module calculates the angle for deviation rectifying according to the acquired steering angle signal value of steering sensor, signal values of runout rate sensor and transverse acceleration sensor.

Figure 4:
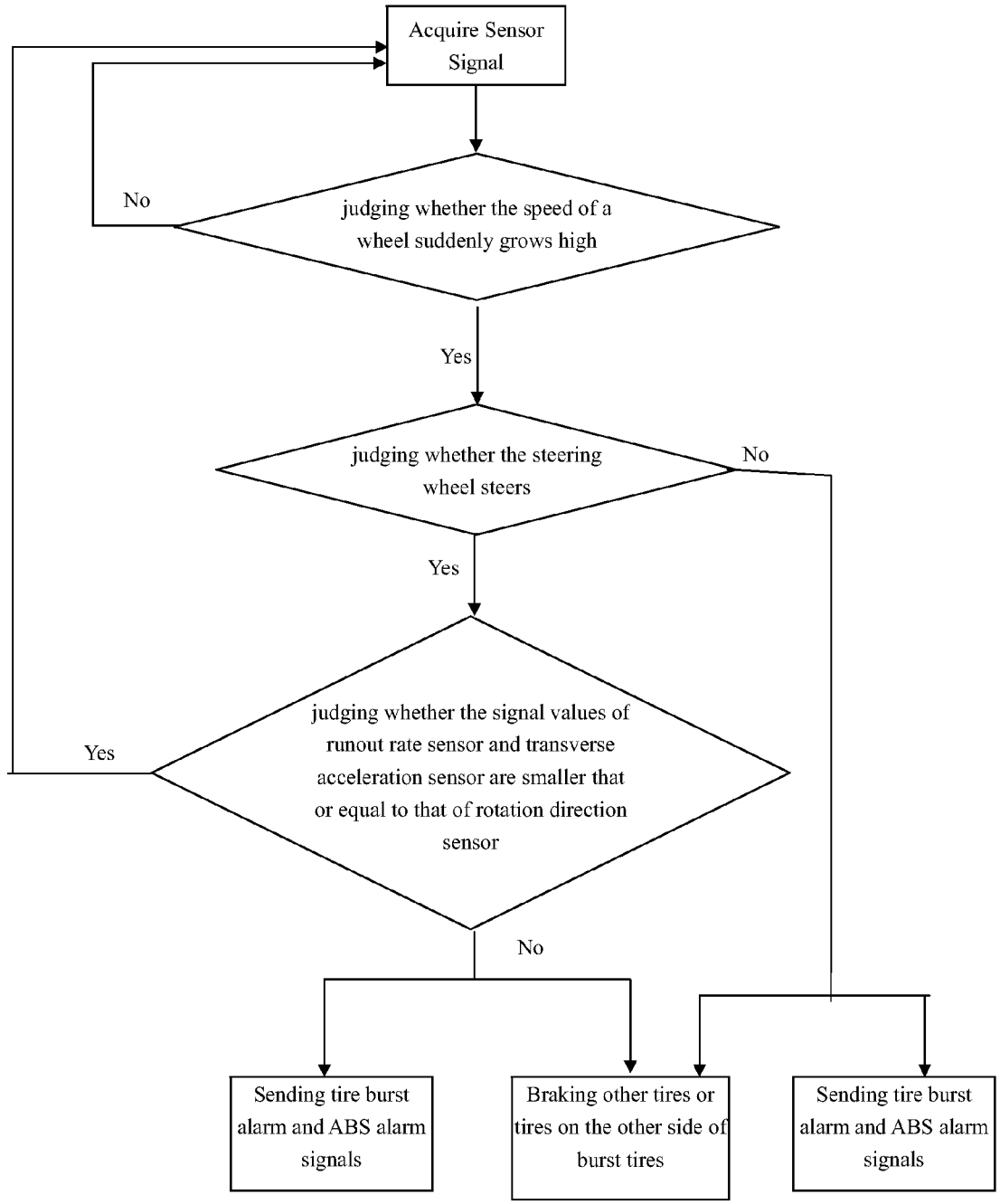
FIG. 4 is a flow diagram of Tire burst detection and anti-deviation in an embodiment of the present invention.

As shown in FIG. 4, FIG. 4 is a flow diagram for tire burst detecting and anti-deviation, in an embodiment of the present invention. The acquisition module of ECU acquires the vehicle condition signals acquired by a variety of sensors. Then the judging module of ECU may judge whether the speed of one wheel suddenly grow high according to the acquired signal of wheel speed sensor 3. If not, no tire burst occurs, and acquired signals will be returned. If so, a tire burst may occur and the following judgments will be executed.

According to the acquired signal of steering sensor, the judging module of ECU may judge whether the steering wheel steers. If not, it is indicated that the abrupt high wheel speed is due to a tire burst rather than a turn of steering wheel, which leads to a judgment that a tire burst occurs by judging module. If so, the judging module of ECU will judge whether the signal values of runout rate sensor and transverse acceleration sensor are smaller than or equal to that of steering sensor. If so, make a judgment that no tire burst occurs and acquired information will be returned without deviation rectifying. If not, make a judgment that a tire burst occurs and deviation rectifying will be needed. The signal values of runout rate sensor and transverse acceleration sensor present only when automobiles turn or sideslip, while the signal value of steering sensor presents only when the steering wheel steers. Therefore, the signal values of runout rate sensor and transverse acceleration sensor change with the signal value of steering sensor, indicating that the first two signal values will not be larger than the latter one under normal circumstances.

When making a judgment that a tire burst occurs, ECU will start the connected alarm module rapidly. The indicator lamp for tire burst of alarm module sends a tire burst alarm and ABS warning lamp of alarm module sends an ABS alarm. Meanwhile, ECU will start the deviation rectifying rapidly as well. Chips applied in the present invention have a quite high processing speed which can start the deviation rectifying process during an extremely short time. The starting time needed for the prior technologies is 0.2 to 1.5 s, while the time for starting the deviation rectifying process for the system in the present invention is within 20 ms. Specific deviation rectifying process is presented as follows:

ECU calculates the angle for deviation rectifying according to the steering angle signal value of steering sensor, signal values of runout rate sensor and transverse acceleration sensor; then ECU sends control instructions, according to which the pressure regulator in the ABS system of automobile executes the corresponding actions to regulate the pressure in brake circuit 4. Subsequently, such pressure regulator brakes other tires or the tires on the other side of burst tire according to the calculated angle for deviation rectifying obtained by calculating module. Such deviation rectifying processes will not be accomplished until the signal value of runout rate sensor after braking is judged to be zero by judging module. If not, the deviation rectifying processes for automobiles will be continued.

Because automobiles generally run in the deviation in a short time after a tire burst, ECU may obtain the specific deviation angle of automobiles according to the signals of runout rate sensor and transverse acceleration sensor. Then the system will control automobiles to run in the opposite direction to rectify the deviation angle and the ABS system component will control bake circuit 4 to implement the deviation rectifying. When the deviation angles of runout rate sensor and transverse acceleration sensor are detected to be zero, the precise deviation rectifying is accomplished.

Prior technologies cannot detect the deviation angles of automobiles after a tire burst, so the specific angles needed for rectifying cannot be obtained, thus causing extremely great errors in actual control. Such errors are related with the speed of automobiles. The higher the speed, the greater the errors. The present invention may implement rapid precise deviation rectifying by applying chips with extremely high processing speed to implement a rapid start of deviation rectifying processes. The starting time needed for the prior technologies is 0.2 to 1.5 s, while such time for the system in the present invention is within 20 ms.

Thus, the present invention may implement the rectifying for a tire burst of automobiles in a short time to avoid the danger of running in the deviation, and comprise the functionalities of tire burst detecting and precise anti-deviation for automobiles, causing the automobiles to run continuously at a certain speed after a tire burst. The present invention also needs no installation of pressure detection device or other hardware on the basis of ABS and ESP system components. The effective rapid tire burst detecting and deviation rectifying may be implemented by upgrading the control procedures.

Therefore, the advantages of the present invention comprise the following aspects such as low cost, fast speed for detecting and deviation rectifying, extremely short time for starting control procedures and precise deviation rectifying.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system for tire burst detecting and anti-deviation, which comprising:
    an ABS system component having a wheel speed sensor for generating a wheel speed signal, wherein the ABS system component is configured to rectify deviation based on a deviation rectifying angle;
    a brake chief-pump and a brake circuit connected with the ABS system component;
    an ESP system component having a steering sensor for generating a steering signal, a runout rate sensor for generating a runout rate signal, and a transverse acceleration sensor for generating a sideslip signal, wherein the steering signal corresponds to a steering angle of a steering wheel, the runout rate signal corresponds to an angle of a vehicle deviated from a straight line, and the transverse acceleration signal corresponds to a sideslip rate of the vehicle; and
    an electrical control unit (ECU) located in the ABS system component, and electrically connected with the wheel speed sensor, the steering sensor, the runout rate sensor and the transverse acceleration sensor, wherein the ECU comprises:
        an acquisition modules for acquiring the wheel speed signal, the steering signal, the runout rate signal and the sideslip signal from the wheel speed sensor, the steering sensor, the runout rate sensor and the transverse acceleration sensor, respectively;
        a judging module for judging whether a tire burst has occurred based on the wheel speed signal, the steering signal, the runout rate signal and the sideslip signal; and
        a calculating module for calculating the deviation rectifying angle based on the steering signal, the runout rate signal and the sideslip signal; and
    wherein the judging module is configured to:
        judge whether a speed of one wheel grows large suddenly according to the wheel speed signal, if no, determine no tire burst has occurred;
        if the speed of one wheel grows large suddenly, judge whether the steering wheel steers according to the steering signal, if no, determine tire burst has occurred; and if the steering wheel steers, judge whether the runout rate signal and the transverse acceleration rate signal are smaller than or equal to the steering signal, if yes, determine no tire burst has occurred, if no, determine tire burst has occurred.

2. The system of claim 1, further comprising a tire burst indicator lamp for alarming tire burst and a ABS warning lamp for ABS alarming when the judging modules judges that the tire burst has occurred, wherein the tire burst indicator lamp and the ABS warning lamp are electrically connected with the ECU.

3. A method for tire burst detecting and anti-deviation of a vehicle, comprising:
 A: acquiring a wheel speed signal, a steering signal, a runout rate signal, and a sideslip signal from a wheel speed sensor, a steering sensor, a runout rate sensor and a transverse acceleration sensor, respectively, wherein the steering signal corresponds to a steering angle of a steering wheel, the runout rate signal corresponds to an angle of a vehicle deviated from a straight line, and the transverse acceleration signal corresponds to a sideslip rate of the vehicle;
 B: judging whether a tire burst has occurred based on the wheel speed signal, the steering signal, the runout rate signal, and the sideslip signal, if yes, executing step C, if no, returning to step A, wherein step B comprises:
  B1: judging whether a speed of one wheel grows large suddenly according to the wheel speed signal, if no, determining no tire burst has occurred;
  B2: if the speed of one wheel grows large suddenly, judging whether the steering wheel steers according to the steering signal, if no, determining tire burst has occurred; and
  B3: if the steering wheel steers, judging whether the runout rate signal and the transverse acceleration rate signal are smaller than or equal to the steering signal, if yes, determining no tire burst has occurred, if no, determining tire burst has occurred; and
 C: performing deviation rectifying for the vehicle according to the runout rate signal, comprising:
  C1: calculating an angle for deviation rectifying according to the steering angle signal, the runout rate signal and the transverse acceleration signal;
  C2: braking other tires or the tires on the other side of the burst tire according to the calculated angle for deviation rectifying; and
  C3: judging whether the runout rate signal is zero after braking, if yes, deviation rectifying is accomplished, and if no, executing step C2.

4. The method of claim 3, further comprising sending a tire burst alarm signal and an ABS alarm signal when making a judgment that the tire burst has occurred.

* * * * *